3,822,221
NOVEL HYDROREFORMING CATALYSTS
Joseph Edouard Weisang and Philippe Engelhard, Le Havre, France, assignors to Compagnie Francaise de Raffinage, Paris, France
Continuation-in-part of application Ser. No. 11,325, Feb. 13, 1970, now Patent No. 3,700,588, dated Oct. 24, 1972. This application Mar. 15, 1972, Ser. No. 234,875
Claims priority, application France, Mar. 24, 1971, 7110459
The portion of the term of the patent subsequent to Oct. 24, 1989, has been disclaimed
Int. Cl. B01j 11/08, 11/22
U.S. Cl. 252—466 PT                    3 Claims

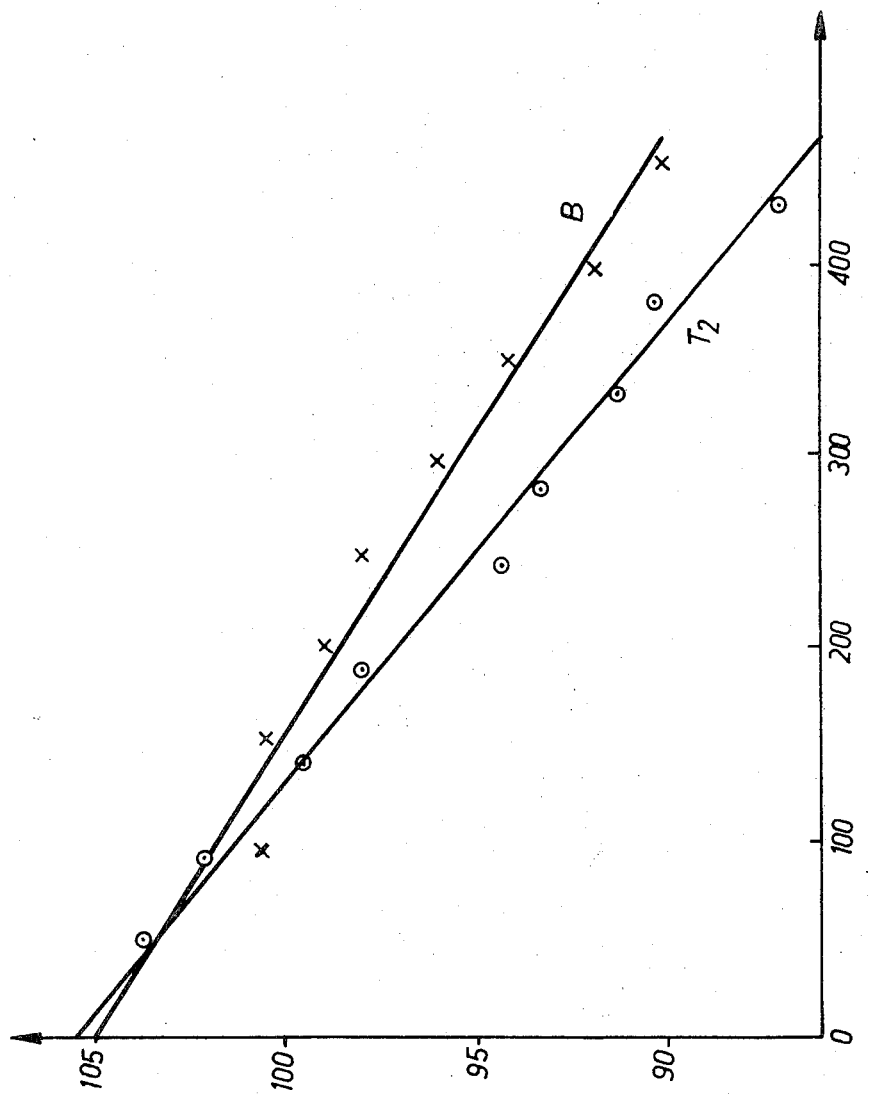

ABSTRACT OF THE DISCLOSURE

Novel catalysts suitable for hydrorefining comprising of alumina, tin or lead and platinum and iridium; a catalyst of alumina, on which tin metal in a particular manner has been first deposited and thereafter platinum has been deposited thereon, is especially advantageous.

---

This application is a continuation-in-part of application Ser. No. 11,325, now U.S. patent 3,700,588 issued Oct. 24, 1972 which application is incorporated by reference herein.

This invention pertains to a catalyst; more particularly, this invention pertains to a hydrorefining catalyst which represents a further nonobvious improvement and an advance over the catalysts disclosed in the above-mentioned parent application.

In reference to the parent application, the object of the latter is a catalyst formed of a support of refractory mineral oxide of a specific surface of more than 15 m.$^2$/g., and a pore volume of more than 0.1 cm.$^3$/g. and having acid sites, and of metals deposited on said support in free or combined form, the said catalysts being characterized by the fact that the said metals consist of:

(a) 0.02 to 2%, and preferably 0.1 to 0.7%, referred to the total weight of the catalyst, of at least one metal belonging to the platinum and paladium lines in Group VIII of the Periodic Table, and (b) 0.02 to 2%, and preferably 0.05 to 0.6%, referred to the total weight of the catalyst, of at least one metal belonging to the group consisting of lead or tin or their mixtures. Additionally, it has been found that germanium is useful in place of lead and/or tin or upon addition to each, or the two, in mixtures.

The present invention relates to catalysts of the type described in the parent application comprising several metals of the platinum group or line and more particularly platinum and iridium. The inventors have noted, as a matter of fact, that these catalysts are very advantageous due to their resistance to aging, particularly when applied to the reforming of charges in the presence of hydrogen.

The preferred object of the present invention is therefore a catalyst in accordance to the parent application which, however, consists essentially of the following composition:

(a) 0.02 to 2%, and preferably 0.1 to 0.7%, of platinum, referred to the total weight of catalyst; and (b) 0.02 to 2%, and preferably 0.1 to 0.7%, of iridium, referred to the total weight of catalyst; and (c) 0.02 to 2%, and preferably 0.05 to 0.6%, of tin, referred to the total weight of catalyst.

The use of this catalyst to the hydroreforming of hydrocarbon charges also constitutes an object of the present invention.

The support of the catalyst in line with the parent application should have the characteristics which are described in said parent application; in particular, the support must have sufficient specific surface, generally between 15 and 350 m.$^2$/g., as well as a sufficient pore volume, generally between 0.4 and 0.8 cm.$^3$/g. Moreover, the support must have isomerizing sites; the latter may be created by a prior treatment of the support with an acid; a suitable acid is hydrochloric acid. If the support is treated with chlorine the catalyst has a range of chlorine content from 0.3 to 1.5 based on percent by weight of the total catalyst.

The processes for depositing metals on the support are the processes customary in the art. Nevertheless, the applicants have obtained particularly satisfactory results by using the impregnation method which consists in immersing the support in a solution containing one or more of the elements to be deposited.

The depositing of iridium does not require any particular precautions over those described in the parent application. One simple method consists in simultaneously depositing the iridium and the tin by impregnation of the support with a solution containing the two elements and then depositing the platinum.

The invention is furthermore illustrated by the following examples, which are not limitative:

EXAMPLE I

An alumina in the form of beads is used, the physical properties of which are as follows:

Average radius of the beads _____ mm __ 1.6
Specific surface _____ m.$^2$/g __ 174
Specific pore volume _____ cm.$^3$/g __ 0.74
Average radius of the pores _____ A __ 85

This alumina is calcined in air for 8 hours at 600° C.; it is then used as support for two catalysts, $T_1$ and A, prepared in the following manner:

Catalyst $T_1$ 10 cc. are prepared of a solution containing 0.268 g. of hydrated iridium chloride in hydrochloric acid (reagent purity).

This solution is diluted with water to 125 cc. and then contacted with 50 g. of the calcined support. After drying and calcining, the impregnated alumina is treated for 24 hours with an 0.1 N hydrochloric acid solution which is kept in circulation. After centrifuging, the alumina is immersed in a hexachloroplatinic acid solution ($H_2PtCl_6 \cdot 6H_2O$). The catalyst is dried and then calcined at 400° C. for 3 hours. The composition of the catalyst $T_1$ (in components other than alumina), expressed in percentage of the total weight of the catalyst, is as follows:

Percent
Platinum _____ 0.35
Iridium _____ 0.14
Chlorine _____ 1.41

Catalyst A

This catalyst is prepared in accordance with the process used for catalyst $T_1$, but the first impregnation solution conatins 0.268 g. of hydrated iridium chloride and 0.189 g. of tin chloride ($SnCl_2 \cdot 2H_2O$). The composition of catalyst A (in components other than alumina), expressed in percentage of the total weight of the catalyst, is as follows:

Percent
Platinum _____ 0.35
Iridium _____ 0.14
Tin _____ 0.21
Chlorine _____ 1.35

Test for catalytic activity

The catalysts $T_1$ and A are subjected to the following catalytic test:

A gaseous stream of hydrogen saturated with normal heptane (by bubbling hydrogen through heptane at 20° C.) passes at a temperature of 520° C. at atmospheric pressure over 2 cm.³ of catalyst placed in a small reactor. The sulfur content of the normal heptane is less than 1 p.p.m.; the hourly space speed of the gaseous mixture (volume of gas passing per hour over a unit volume of the catalyst) is equal to 80. The proportion of normal heptane in the gaseous stream introduced into the reactor is equal to 2.5%. The efflux of the reactor is analyzed by vapor-phase chromatography.

The results obtained with the catalysts $T_1$ and A are set forth in Table I in which have been entered for each catalyst at four different time periods the respective values, data or yields, to wit:

composition of the efflux in hydrocarbons having four and less than four carbon atoms;

remaining normal heptane;

hydrocarbons having five and more than five carbon atoms, other than the unreacted normal heptane;

research octane number (R.O.N.) of the liquid efflux after stripping of the hydrocarbons having four and less than four carbon atoms.

TABLE I

| Catalyst | Characteristic values of the efflux (wt. percent of the charge) | Operating time (hours) | | | |
|---|---|---|---|---|---|
| | | 1 | 3 | 5 | 7 |
| $T_1$ | $C_1$-$C_4$ | 31.7 | 31.5 | 31.5 | 32.5 |
| | $nC_7$ | 0 | 0.4 | 0.4 | 0.8 |
| | $C_5$+ (other than $nC_7$) | 68.3 | 68.1 | 68.1 | 66.7 |
| | R.O.N.* | 113.1 | 113.4 | 113.7 | 110.7 |
| A | $C_1$-$C_4$ | 16.8 | 17.4 | 17.0 | 16.1 |
| | $nC_7$ | 0 | 0 | 0.6 | 0.7 |
| | $C_5$+ (other than $nC_7$) | 83.2 | 82.6 | 82.4 | 83.2 |
| | R.O.N.* | 119.8 | 119.8 | 119.0 | 117.6 |

*R.O.N. = Research Octane Number.

The analysis of the results set forth in Table I shows the advantages resulting from the use of catalyst A.

EXAMPLE II

An alumina is used in the form of extruded articles, the physical properties of which are as follows:

Average diameter of extruded articles _____ mm __ 1.5
Specific surface _____ m.²/g __ 190
Pore volume _____ cm.³/g __ 0.51
Average radius of the pores _____ A __ 53

This alumina is calcined at a temperature of 600° C. for 4 hours. It is then divided into two portions.

Catalyst $T_2$

The first portion of the above two portions, $T_2$, is immersed in a hydrochloric solution of stannous chloride in such amount that the final tin content of the catalyst, referred to its metal form, is equal to 0.2% by weight. The impregnated support is then placed in a rotary evaporator; it is then dried and then calcined at 600° C. for 2 hours.

0.1 N hydrochloric acid is then caused to flow for 24 hours over the alumina supporting the tin, which is then contacted with a chloroplatinic acid solution in such concentration that the final platinum content of the catalyst, referred to its metallic form, is equal to 0.35% by weight. The catalyst is dried and then calcined at a temperature of 400° C. for 4 hours. There is thus obtained a catalyst $T_2$, the composition of which is as follows, i.e. in components other than alumina:

| | Percent |
|---|---|
| Platinum | 0.35 |
| Tin | 0.20 |
| Chlorine | 1.50 |

Catalyst B

The second portion of the above two portions, B, is immersed in a hydrochloric solution of stannous chloride and iridium chloride; the tin and iridium concentrations of the solution are such that the final contents of these two elements in the catalyst, referred to their metallic form, are equal to 0.2% by weight. The rest of the preparation of catalyst B is identical to that described above for catalyst $T_2$. There is thus obtained a catalyst B, the composition of which is as follows, i.e. of components other than alumina:

| | Percent |
|---|---|
| Platinum | 0.35 |
| Tin | 0.20 |
| Iridium | 0.20 |
| Chlorine | 1.60 |

Test for catalytic activity

The two catalysts thus prepared are then tested in identical, parallel tests carried out on 100 cm.³ of catalyst under the following operating conditions:

Hourly space velocity of liquid charge _____ 1.5
Total pressure in the reactor _____ bars (gauge) __ 7
Ratio of the number of mols introduced hydrogen/ charge _____ 7
Average temperature of the catalyst _____ ° C __ 510

The charge to be reformed comes from an Iraq crude oil; it has the following properties:

Initial distillation point ASTM _____ ° C __ 60
End distillation point ASTM _____ ° C __ 142
Density measured at 20° C. _____ 0.711
Molecular weight (API nomographs) _____ 103
Components by volume:
    Paraffin hydrocarbons _____ percent __ 70
    Naththene hydrocarbons _____ do ____ 24
    Aromatic hydrocarbons _____ do ____ 6
Sulfur content _____ p.p.m __ 2

The increase in temperature of the catalysts, effected prior to the tests proper, is carried out in the following manner:

The catalyst is heated at a rate of 50° C./hour under a pressure of pure hydrogen (7 bars, without recycling) until a temperature of 380° C. is reached. After stabilization at this temperature, the recycle compressor is placed in operation; thereupon the sulfurating of the catalyst is effected by passage of an amount of $H_2S$ corresponding to 500 p.p.m., referred to the weight of the hydrogen. The hydrogen and the charge are then introduced in proportions such that the molar ratio of hydrogen/charge is equal to 7; the hydrogen is separated at the outlet of the reactor and is recycled; after stabilization of the temperature, the temperature is increased at a rate of 50° C./hour up to 510° C. The test proper then starts; the temperature is maintained at the value of 510° C. for the entire duration of the test.

The results of the two tests carried out on catalyst $T_2$ and B have been entered in Table II, in which there are set forth in succession:

the number of hours of operation without interruption;

the volume of charge treated (in liters measured at 20° C. per kilogram of catalyst);

the average temperature of the catalyst;

the research octane number (R.O.N.) of the obtained liquid fraction, measured without addition of tetraethyl lead;

the yield in hydrocarbons having five and more than five carbon atoms, expressed in volume referred to the charge;

the ratio of the volume of hydrogen formed (measured in liters under normal conditions) to the volume of charge introduced (measured in liters at liquid state at 20° C.); the composition by volume of the liquid efflux.

concentration that the final amount of platinum, referred to its metal form, in the catalyst is equal to 0.38% by weight. The catalyst is dried and then calcined at 400° C. for 3 hours.

TABLE II

| Catalyst | $T^2$ | $T^2$ | $T^2$ | $T^2$ | $T^2$ | $T^2$ | B | B | B | B | B | B |
|---|---|---|---|---|---|---|---|---|---|---|---|---|
| Hours of operation | 24 | 72 | 120 | 168 | 192 | 216 | 25 | 73 | 121 | 169 | 193 | 217 |
| Volume of charge treated (k./kg.) | 48 | 144 | 240 | 336 | 384 | 432 | 52 | 152 | 252 | 352 | 402 | 452 |
| Average temperature (° C.) | 509 | 510.3 | 509.8 | 510.2 | 510.7 | 510 | 510.3 | 511.2 | 510 | 511.2 | 510.5 | 510 |
| Octane Number (R.O.N.) | 103.8 | 99.7 | 94.2 | 91.4 | 90.5 | 87.3 | 103.7 | 100.4 | 98 | 94.2 | 92.1 | 90 |
| Yield $C^5+$ (percent) | 66.4 | 64 | 68.9 | 74.4 | 75.3 | 78.6 | 66.1 | 66 | 70.9 | 74.2 | 77.7 | 76.7 |
| Yield $H^2$ formed (1/1) | 188 | 182 | 146 | 132 | 132 | 115 | 182 | 185 | 174 | 153 | 153 | 156 |
| Composition by volume: | | | | | | | | | | | | |
| Paraffin hydrocarbons | 22 | 30 | 41 | 45 | 47 | 49 | 23 | 30 | 37 | 43 | 45 | 48 |
| Naphthene hydrocarbons | 2 | 4 | 6 | 8 | 8 | 9 | 3 | 4 | 6 | 8 | 12 | 10 |
| Aromatic hydrocarbons | 76 | 66 | 53 | 47 | 45 | 42 | 74 | 66 | 57 | 49 | 43 | 42 |

The sole Figure accompanying the specification consists of the two curves representing the value of the octane number of the reformate as a function of the volume of charge treated with catalysts $T_2$ and B respectively, under the conditions and with the charge described in the example.

In the Figure, $x$ axis represents the volume of charge treated expressed in liters/kg. of catalyst and $y$ axis represents octane numbers.

Catalyst B, which contains iridium, proves to be superior in time to catalyst $T_2$ which does not contain any.

Catalytical activity as a consequence of the order of the deposition of tin and platinum In order to illustrate the surprising behavior in the method of depositing the catalyst components, the following comparative catalytic tests were carried out:

Preparation of the catalysts: Alumina was used which is available in the form of extruded products, the characteristics of which are as follows:

Average diameter of extruded alumina _____mm__ 1.5
Specific surface _____m.²/g__ 190
Pore volume _____cm.³/g__ 0.51
Average radius of the pores _____A__ 53

This alumina was calcined for 4 hours at 600° C.

Catalyst A¹

A batch of alumina corresponding to that which has just been described is immersed in a hydrochloric solution of stannous chloride in such amount that the final content of tin in the catalyst, referred to its metallic form, is equal to 0.20% by weight. The impregnated support is then placed in a rotary evaporator, whereupon it is dried and then calcined at 600° C. for 2 hours.

0.1 N hydrochloric acid is then circulated for 24 hours over the alumina supporting the tin, which is then contacted with a chloroplatinic acid solution of such concentration that the final amount of platinum, referred to its metallic form, in the catalyst is equal to 0.36% by weight. The catalyst is dried and then calcined at a temperature of 400° C. for 3 hours. In this way there is obtained a catalyst having the following composition by way of components other than alumina:

A¹

Percent
Platinum _____ 0.36
Tin _____ 0.20
Chlorine _____ 1.39

Catalyst $T_x$

A batch of alumina in accordance with that which has been described above is treated by 0.1 N hydrochloric acid for 24 hours with circulation. The alumina is then contacted with a hexachloroplatinic acid solution in such The catalyst $T_x$ obtained has the following composition:

$T_x$

Percent
Platinum _____ 0.38
Chlorine _____ 1.47

Catalyst $T_y$ 50 grams of catalyst $T_x$ are contacted at room temperature with 125 cc. of a flowing solution containing 0.190 g. of dehydrated stannous chloride and 1 cc. of normal nitric acid. After half-an-hour circulation, the solution no longer contains any tin.

The catalyst $T_y$ obtained after drying and calcining has the following composition:

$T_y$

Percent
Platinum _____ 0.38
Tin _____ 0.22
Chlorine _____ 1.43

Catalyst $T_z$

There is available a catalyst prepared industrially from the support described above and comprising 0.35% platinum by weight. This catalyst is placed in a column in which there is circulated a solution of stannous chloride in such concentration and for such a period of time that the final solid contains 0.20% tin.

The composition of the catalyst $T_z$, after drying and calcining, is as follows:

$T_z$

Percent
Platinum _____ 0.35
Tin _____ 0.20
Chloride _____ 1.48

Test for catalytic activity

The four catalysts prepared are subjected to the following test:

25 cc. of catalyst are placed in a stainless steel reactor; a stream of pure, dry hydrogen is passed over the catalyst for 2 hours, the temperature of the catalyst being maintained at 500° C. and the pressure within the reactor being maintained at 7 bars. Thereupon the temperature is increased to 510° C. and there is then introduced the batch consisting of n-heptane with a liquid hourly space speed equal to 2 and a ratio of the number of mols of hydrogen introduced and the number of mols of n-heptane introduced equal to 5.

Samples taken from the efflux of the reactor make it possible to determine on the one hand the liquid yield per simple weighing and on the other hand the equivalent octane number of the liquid by application to the chromatographic analyses of the liquid of the ASTM mixture numbers appearing on nomographs.

The curve of decrease of the octane number as a function of the time is a straight line. The slope of this line is therefore a faithful representation of the stability of the catalyst.

In the following table there have been collected the results obtained by subjecting catalysts $A^1$, $T_x$, $T_y$ and $T_z$ to the test which has just been described.

TABLE III

| Catalyst | Initial octane number | Octane points lost in 100 hours | Average yield |
|---|---|---|---|
| $A^1$ | 111.9 | 11.5 | 65.3 |
| $T_x$ | 109.8 | 23.6 | 61.7 |
| $T_y$ | 105.5 | 28.5 | 61.5 |
| $T_z$ | 105.1 | 16.6 | 64.4 |

From the above data it follows:

(1) The catalysts which contain tin ($A^1$ and $T_z$) are superior with respect to stability and yield to those which do not contain it ($T_x$).

Catalyst $T_y$, although it contains tin, is of a behavior inferior to $T_x$ because the tin was deposited without special precautions.

(2) The order of the depositing of the platinum and tin affects the values of the initial octane number, the stability and the average yield, as is shown by the comparison of the results of catalysts $A^1$ and $T_z$.

It is therefore advantageous to deposit the tin first. This was not obvious a priori, but has been discovered, and this method constitutes the best method of preparing the catalysts.

Without being bound by a theory on the correctness of it, it is postulated that the role of the tin is to modify the support and thus permit a more dispersed and more accessible deposit of platinum than on a support which has not been subjected to a prior deposit of tin.

What is claimed is:

1. A hydroreforming, substantially reduced non-cracking catalyst composition comprising of a support of alumina of a specific surface of more than 15 m.$^2$/g., of a pore volume of more than 0.1 cm.$^3$/g. and having acid sites, and of metals on the said support, said metals on said catalyst support consisting essentially of:
    (a) 0.02 to 2% of platinum, referred to the total weight of the catalyst;
    (b) 0.02 to 2% of iridium, referred to the total weight of the catalyst;
    (c) 0.02 to 2% of tin, referred to the weight of the catalyst.

2. The catalyst as defined in Claim 1 and wherein said metals on said support consist essentially of:
    (a) 0.1 to 0.7% of platinum;
    (b) 0.1 to 0.7% of iridium;
    (c) 0.05 to 0.6% of tin,
said weight percentages being based on the total weight of the catalyst.

3. Catalysts according to Claim 1 and wherein the porous support is an alumina of a specific surface between 100 and 350 m.$^2$/g.

References Cited

UNITED STATES PATENTS

| | | | |
|---|---|---|---|
| 3,718,578 | 2/1973 | Buss et al. | 208—139 |
| 3,700,588 | 10/1972 | Weisang et al. | 208—139 |
| 3,554,902 | 1/1971 | Buss | 252—466 PT |
| 3,696,167 | 10/1972 | Juguin et al. | 252—466 PT |
| 3,558,523 | 1/1971 | Rausch | 252—466 PT |

CARL F. DEES, Primary Examiner

U.S. Cl. X.R.

208—139